(12) United States Patent
Sundermann

(10) Patent No.: US 6,268,987 B1
(45) Date of Patent: Jul. 31, 2001

(54) GROUND FAULT CIRCUIT INTERRUPTER

(75) Inventor: Siegfried Sundermann, Zeiselmauer (AT)

(73) Assignee: Moeller Gebaudeautomation KG, Schrems (AT)

(*) Notice: Subject to any disclaimer, the term of this patent is extended or adjusted under 35 U.S.C. 154(b) by 0 days.

(21) Appl. No.: 09/294,084

(22) Filed: Apr. 19, 1999

(30) Foreign Application Priority Data

Apr. 17, 1998 (AT) .......................................... 656/98

(51) Int. Cl.[7] .................................................. H02H 3/00
(52) U.S. Cl. ............................ 361/42; 361/47; 361/93.6; 361/115
(58) Field of Search .................................. 361/42, 47, 48, 361/93.1, 93.6, 115, 91.1, 102; 335/18, 6, 12–13, 162, 202

(56) References Cited

U.S. PATENT DOCUMENTS 5,371,646 * 12/1994 Biegelmeier ............................ 361/47

FOREIGN PATENT DOCUMENTS

| 35 28 702 | 2/1986 | (DE) . |
| 0 495 771 | 7/1992 | (EP) . |
| 0 570 603 | 11/1993 | (EP) . |
| 2 549 287 | 1/1985 | (FR) . |

* cited by examiner

Primary Examiner—Michael J. Sherry
(74) Attorney, Agent, or Firm—Young & Thompson

(57) ABSTRACT

A ground fault circuit interrupter has a residual current transformer (7) which is connected via evaluation and tripping electronics (6) to a open circuit shunt release (3), the open circuit shunt release (3) via a breaker mechanism (5) actuating the main contacts (10) in the leads (L1, L2, L3) to be monitored, the line voltage supply of the evaluation and/or tripping electronics (6) and/or the open circuit shunt release (3) being connected electrically separably to a least two leads (L1, L2, L3, N) via auxiliary contact apparatus (8). In this way the line voltage supply for the evaluation and/or the tripping electronics (6) and the open circuit shunt release (3) can be interrupted independently of the line-side or load-side terminal with respect to the main contacts (10) and is still ensured when one or two leads (L1, L2, L3, N) are interrupted.

7 Claims, 5 Drawing Sheets

GROUND FAULT CIRCUIT INTERRUPTER

FIELD OF THE INVENTION

The invention relates to a ground fault circuit, interrupter with a residual current transformer which is connected via evaluation and tripping electronics to a open circuit shunt release, the open circuit shunt release via a breaker mechanism actuating the main contacts in the leads to be monitored, the line voltage supply of the evaluation and/or tripping electronics and/or the open circuit shunt release being connected electrically separably to a least one lead.

BACKGROUND OF THE INVENTION

EP 495 771 A2 discloses a generic circuit interrupter in which the trip of the breaker mechanism is connected electrically separably to an outer lead and the neutral lead via a switch. When the outer lead or neutral lead is interrupted there is therefore no longer any operation of the FI interrupter.

EP 0 570 603 A discloses a residual current circuit breaker which is dependent on the line voltage and in which the tripping relay is supplied between all three outer leads and the neutral lead. The electronics of the residual current circuit breaker which is known from EP 0 570 603 A1 is however unable to turn off the load current which flows when tripped by the tripping relay, if the terminal for the load current is between the power supply line and the main contacts for the phase conductor. For this reason, in the known residual current circuit breaker the load side and the line side are stipulated so that the main contacts also undertake turning off the load current.

OBJECT OF THE INVENTION

The object of the invention is to further develop a very reliable ground fault circuit interrupter of the initially mentioned design such that the load side and the line side can be optionally chosen, and which is built and can be assembled as simply as possible.

SUMMARY OF THE INVENTION

This object is achieved with a ground fault circuit interrupter with a residual current transformer which is connected via evaluation and tripping electronics to an open circuit shunt release, the open circuit shunt release via a breaker mechanism actuating the main contacts in the leads to be monitored, the line voltage supply of the evaluation and/or tripping electronics and/or the open circuit shunt release being connected electrically separably to a least one lead, which is characterized in that the evaluation and/or tripping electronics and/or tlae open circuit shunt release is connected via auxiliary contact apparatus to at least two leads, and that the movable auxiliary contacts of the auxiliary contact apparatus are located on a drum controller of the main contact and the housing-mounted auxiliary contacts of the auxiliary contact apparatus are located in the housing cover of the ground fault circuit interrupter.

In the invention it is provided that the line voltage supply of the evaluation and/or tripping electronics and/or the open circuit shunt release is connected electrically separably to at least two leads; this offers the advantage that the line voltage supply is reliably separated in any case, regardless of on what side the power supply and load are connected to the ground fault circuit interrupter. The at least two-pole line voltage supply increases operating reliability since it still works even if one of the two poles fails.

Since the movable auxiliary contacts are located on the drum controller of the main contact, the ground fault circuit interrupter as claimed in the invention is characterized by technical simplicity, since the auxiliary contact apparatus in this case are actuated at the same time with the main contacts on the drum controller.

In a development of the invention voltage can be supplied to the evaluation and/or tripping electronics and/or the open circuit shunt release via a rectifier and the rectifier can be connected to the line by three poles or all poles.

Here, due to the multi-pole supply of the open circuit shunt release which is preferably full-wave rectified, the operating reliability of the ground fault circuit interrupter is increased, since, for example for all-pole supply, it can still work even when two poles fail, since the open circuit shunt release is still supplied with line voltage even. if for example two outer leads or one outer lead and the neutral lead fail in a case of tripping.

With the appropriate dimensioning of the parts of the ground fault circuit interrupter operation is ensured starting with $0.4 \times U_n$ for two-pole supply and up to $1.1 \times U_n$ for all-pole supply (nominal voltage 230/400 V).

To make the structure and assembly of the ground fault circuit interrupter very simple, it can be developed in that the housing-mounted auxiliary contacts, the rectifier, optionally the overvoltage protection, the power cables which lead from the auxiliary contacts to the rectifier, and the contacts located on the DC voltage side following the rectifier are located in the housing cover of the ground fault circuit interrupter and in that the contacts in the housing trough are assigned to the contacts in the housing cover and are electrically connected to the evaluation and/or tripping electronics and/or the open circuit shunt release.

This makes it possible to premount the entire voltage supply of the evaluation and/or tripping electronics and/or the open circuit shunt release on the housing cover of the ground fault circuit interrupter, the pertinent contacts or connections being automatically produced in the assembly of the housing cover; this is very simple.

BRIEF DESCRIPTION OF THE DRAWINGS

Other details, features and advantages of the ground fault circuit interrupter follow from the following description of the embodiments of the invention shown in the drawings.

DETAILED DESCRIPTION OF THE INVENTION

Figure 1:
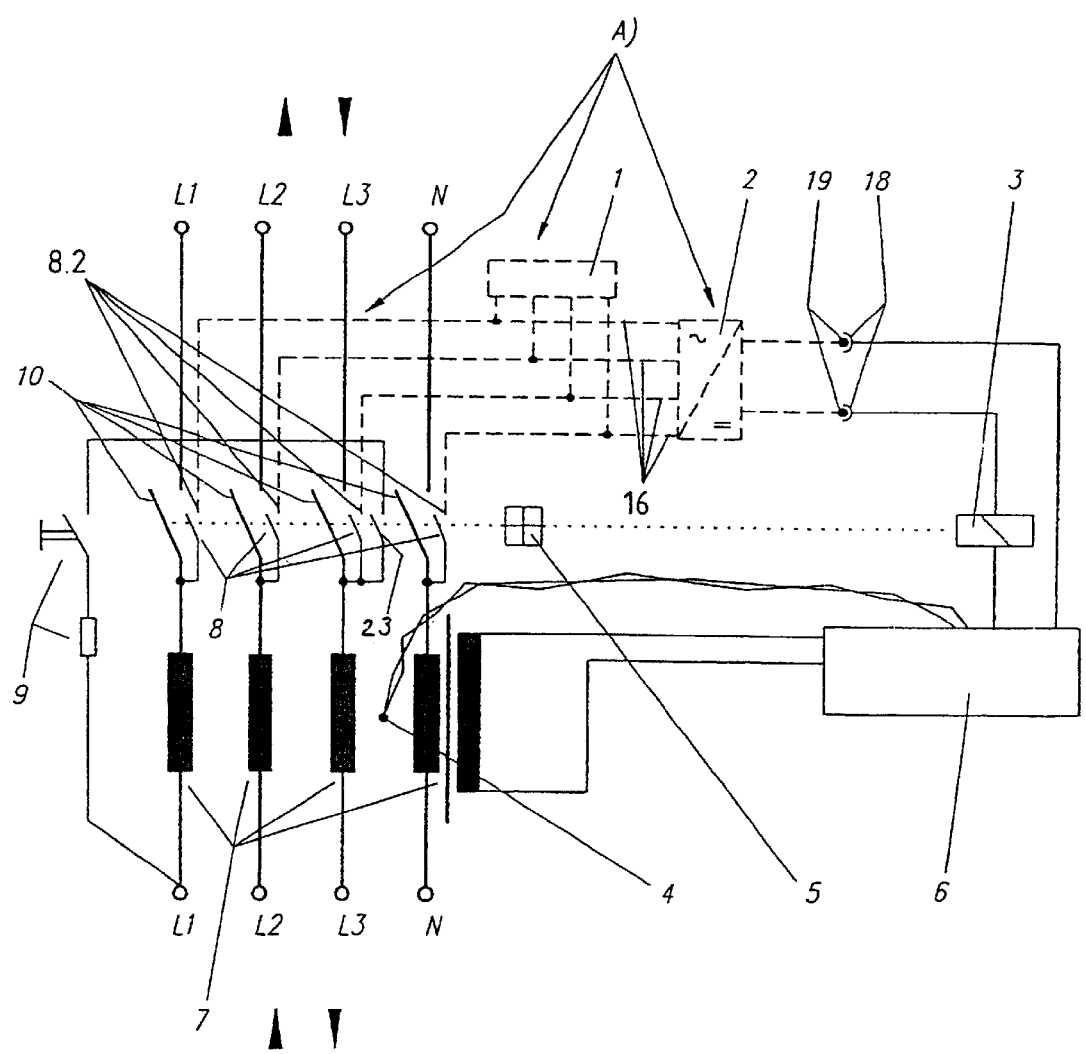
FIG. 1 shows by way of example the diagram of a ground fault circuit interrupter as claimed in the invention with all-pole supply.

The ground fault circuit interrupter with its diagram shown in general in FIG. 1 is as usual connected via terminals to the phase conductor (outer leads L1, L2, and L3, neutral lead N). The secondary winding of a residual current transformer 7 with primary windings connected to the phase conductor is connected to evaluation and/or tripping electronics 6. Both the evaluation and tripping electronics can work dependently or independently of the line voltage. These evaluation and/or tripping electronics 6 can have a power storage circuit and a transformer relay (monostable or bistable relay) or a thyristor breaker gap, as is known from EP 0 495 771 A.

If the fault current in the primary winding of the residual current transformer 7 exceeds a preset value, the: evaluation and/or tripping electronics 6 trigger and the circuit in which there is an open circuit shunt release 3 actuates the breaker mechanism 5 which opens the main contacts 10, depending on the line voltage. At the same time the contact 23 of the test means 9 is opened.

As is shown in the diagram from FIG. 1, the open circuit shunt release 3 is supplied by all poles with line voltage via a rectifier 2 which is preferably a full-wave rectifier. This is done such that one auxiliary contact apparatus 8 is assigned to each main contact 10. The auxiliary contact apparatus 8 are actuated jointly with the main contacts in the case of tripping of the breaker mechanism 5. This means that the auxiliary contact apparatus 8 are open also when the main contacts 10 are opened and that the auxiliary contact apparatus 8 are closed also when the main contacts 10 are closed. But it is also possible to connect only the outer leads L1, L2 and L3 via the auxiliary contact apparatus 8, the neutral lead N permanently or not at all to the line voltage supply of the evaluation and/or tripping electronics 6 and/or the open circuit shunt release 3.

An overvoltage protector 1 which is for example a varistor and/or a spark gap and/or a series resistor and/or a Zener diode and/or a Transorb and/or Transguard protective element is integrated into the lines 16 which lead from the fixed auxiliary contacts 8.2 of the auxiliary contact apparatus 8 to the rectifier 2. This overvoltage protector ensures than the following electronics (rectifier 2, evaluation and/or tripping electronics 6) are protected in the case of line overvoltages (in the sequence of lightning, switching operations or the like).

It can be recognized that with a ground fault circuit interrupter with the circuitry shown in FIG. 1, all-pole switching of the supply of the open circuit shunt release 3 and subsequent full-wave rectification ensure operation of the ground fault circuit interrupter even if two leads fail. For example, operation of the ground fault circuit interrupter is also ensured if the two outer leads or one outer lead and the neutral lead of the power supply fail.

As overload protection, to the summation current transformer there is assigned a temperature sensor 4 which, when a certain temperature acquired by it in the summation current transformer 7 is reached, causes the FI interrupter to be turned off before an undue load due to overload and/or damage of the FI interrupter due to heating occurs. This can take place for example by direct charging of the energy storage via the thermal protection.

In the ground fault circuit interrupter the all-pole auxiliary switch 8 integrated into it turns off the load current which actuates the open circuit shunt release 3 after tripping.

In the circuit diagram shown in FIG. 1 it is also indicated that certain components, specifically those shown in FIG. 1 by the broken line, can be integrated for example in the housing cover of the ground fault circuit interrupter. Thus for example the fixed auxiliary contacts 8.2 of the auxiliary contact apparatus 8 can be mounted in the switch cover; this represents a simple solution with respect to material and labor input. Also the rectifier 2 and overvoltage protector 1 can be integrated into the switch cover and premounted thereon.

Here there can be contacting of the circuit for the open circuit shunt release 3 on the DC voltage side in the housing cover so that when the housing cover is mounted contacting of the DC side on the open circuit shunt release 3 and the evaluation and/or tripping electronics 6 (tripping slot) takes place with mounting of the switch cover. This is a simple process.

Figure 2:
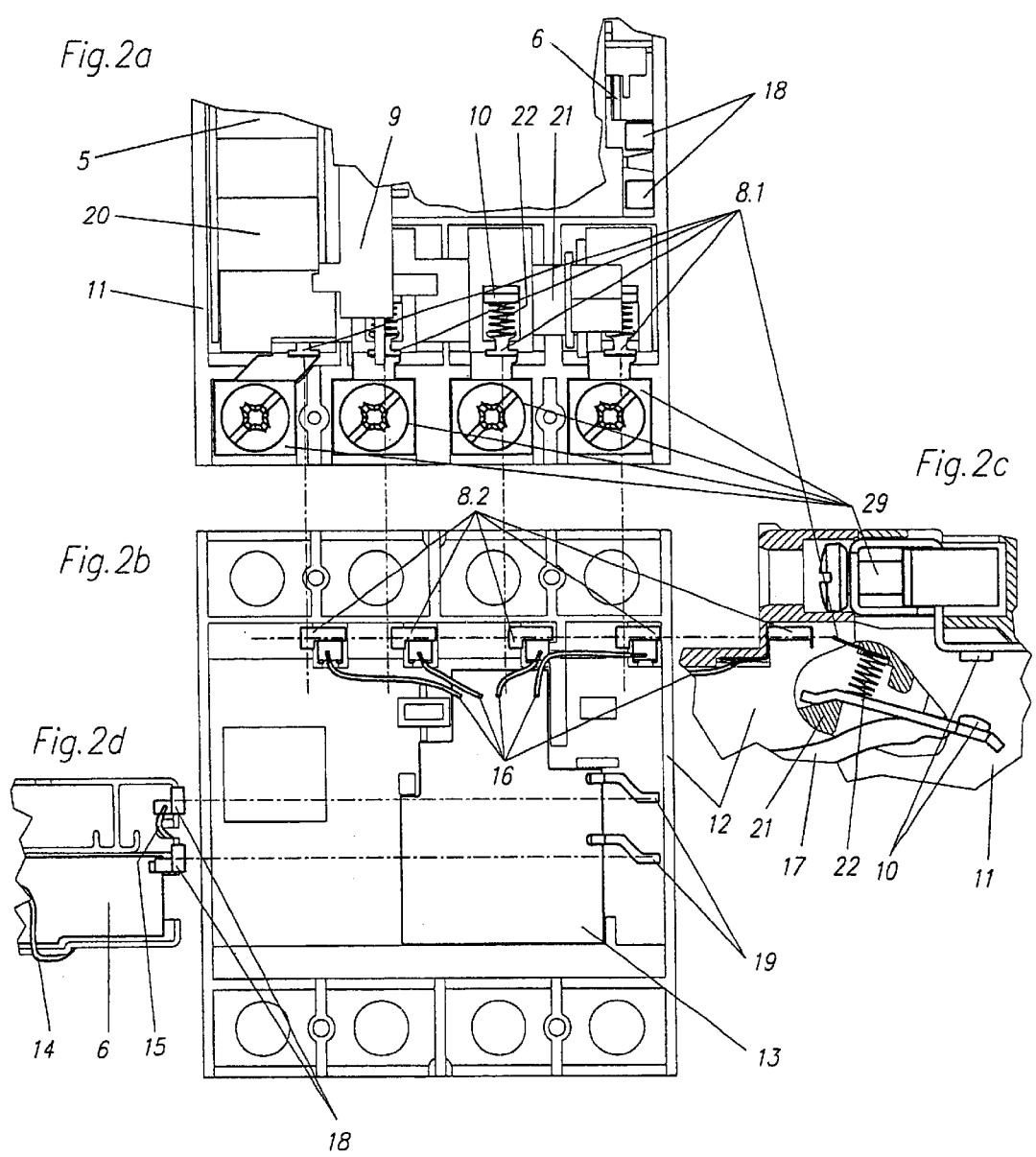
FIG. 2 shows the important parts of one practical embodiment of a ground fault circuit interrupter as claimed in the invention.
Figure 3:
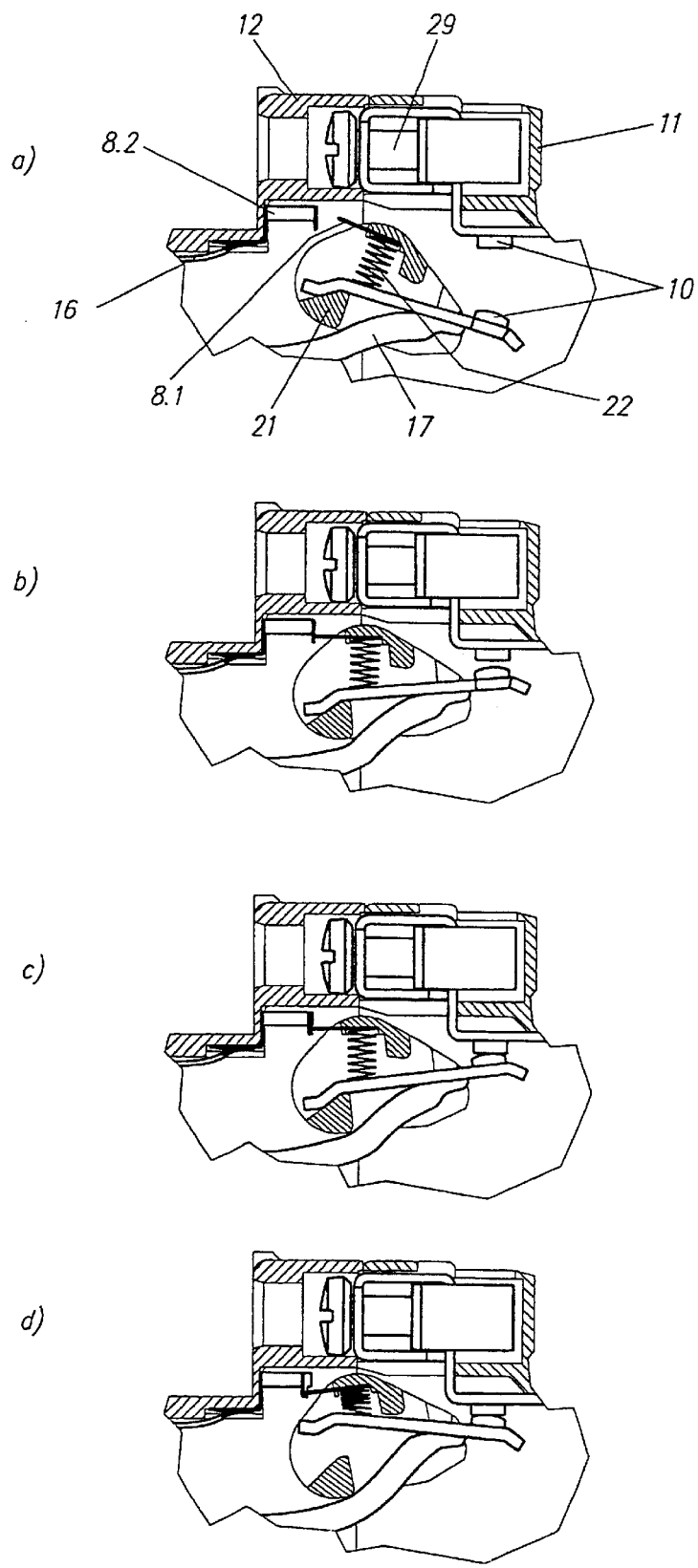
FIG. 3 shows the time sequence of contact touches in a ground fault circuit interrupter, FIG. 4 a diagram of a ground fault circuit interrupter as claimed in the invention with two-pole supply.

With reference to FIGS. 2 and 3, in the following one practical embodiment of a ground fault circuit interrupter is explained by way of example. The fundamental structure of the ground fault circuit interrupter can thus correspond for example to the structure of the ground fault circuit interrupter as claimed in EP 0 495 771 A2.

FIG. 2 shows a ground fault circuit interrupter in the OFF position.

FIG. 2a shows in part the housing trough 11 which forms the lower part of the housing of the ground fault circuit interrupter, that is, the part which is to be fixed on a mounting rail. The housing trough 11 accommodates a total of eight terminals 29 (only four are visible). Furthermore, in the housing trough 11 a drum controller 21 (compare FIG. 2c) is pivotally mounted and carries the movable switch bridges of the main contacts 10. On the movable switch bridges of the main contacts 10 the main lines 17 are attached in the form of stranded conductors.

The housing trough 11 furthermore accommodates the breaker mechanism 5 with an actuating knob 20 for manual switching, the test means 9, the evaluation and/or tripping electronics 6 and the summation current transformer 7 (FIG. 1).

As shown in FIG. 2c, the movable switch bridges of the main contacts 10 located on the drum controller 21 are loaded by springs 22 so that they can swivel in the ON position (see FIG. 3d) relative to the drum controller 21 with compression of the spring 22.

The springs 22 are used at the same time to fix the movable auxiliary contacts 8.1 of the auxiliary contact apparatus 8 on the drum controller 21.

As shown in FIG. 2b, the housing-mounted auxiliary contacts 8.2 of the auxiliary contact apparatus 8 which are assigned to the movable auxiliary contacts 8.1 are mounted in the housing cover 12. The power cables 16 proceed from the fixed auxiliary contacts 8.2 and lead to the rectifier 2 and overvoltage protector 1 likewise attached in the housing cover 12. In this case the overvoltage protection 1 and the rectifier 2 are made as a slot 13 and can be fixed in the housing cover 12. Two lead lugs project laterally away from the slot 13 and form the housing cover-mounted contacts 19 for the DC-side contacting (see reference numbers 18 and 19 in FIG. 1). The contacts 18 on the evaluation and/or tripping electronics 6 and the open circuit shunt release 3 are assigned to these contacts 19 (see FIG. 2a and 2d) so that the contacts 19 and 18 touch one another with the housing cover 12 seated on the housing trough 11 and thus the electrical connection for power supply of the open circuit shunt release 3 with line voltage (in case of tripping) is ensured. The lines which lead to the open circuit shunt release 3 are labelled 14 and 15 in FIG. 2d.

The time sequence of contact movements shown in FIG. 3 can be taken from the following: In the OFF position of the ground fault circuit interrupter as claimed in the invention both the main contacts 10 and also the auxiliary contacts 8.1, 8.2 are open. If the drum controller 21 i s turned using the switching knob 20 in the sense of a closing motion, first the movable auxiliary contacts 8.1 touch the stationary auxiliary contacts 8.2 of the auxiliary contact apparatus 8, as shown in FIG. 3b.

As the drum controller 21 continues to turn, the contacts of the main contacts 10 touch one another (FIG. 3c).

By continuing to turn the drum controller 21, finally the ON position as shown in FIG. 3d is reached in which the drum controller 21 is locked by the breaker mechanism. In this ON position both the movable switch bridges of the main contacts 10 and also the movable auxiliary contacts 8.1 of the auxiliary contact apparatus 8 are swivelled relative to the drum controller 21, the springs 22 being pressed together.

Figure 4:
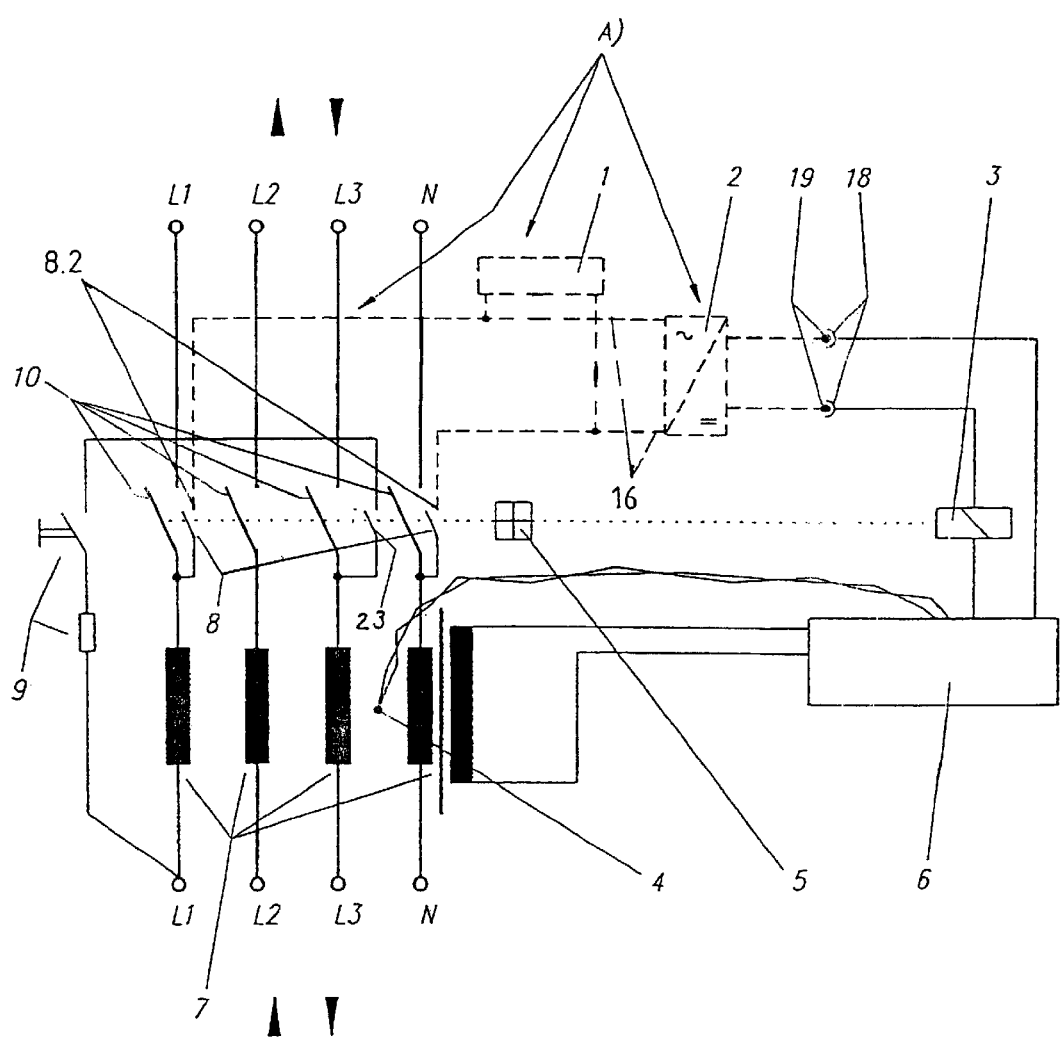
Figure 5:
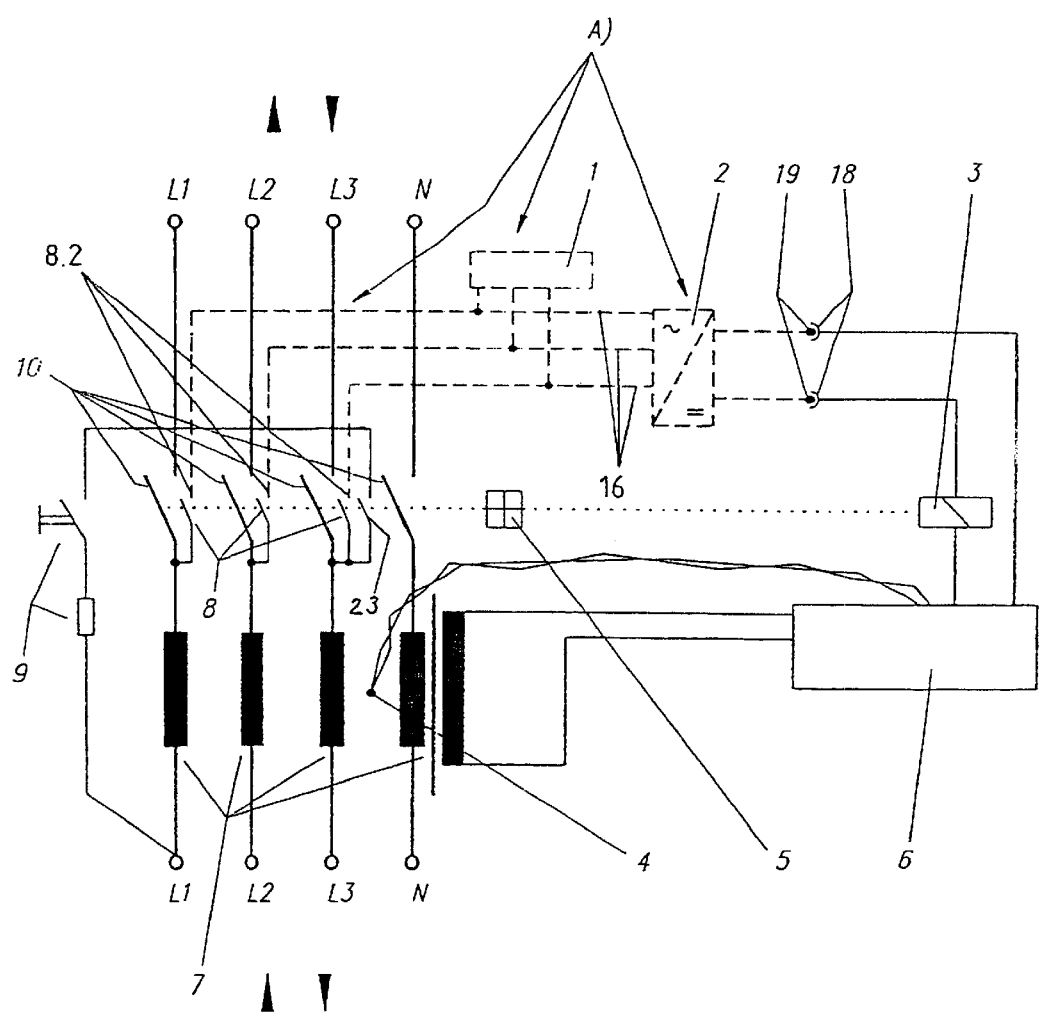
FIG. 5 shows a diagram of a ground fault circuit interrupter as claimed in the invention with three-pole supply.

FIG. 4 shows a ground fault circuit interrupter which corresponds to FIG. 1, the evaluation and/or tripping electronics 6 and the open circuit shunt release 3 being supplied via two poles (L1, N) via the rectifier 2 with the line voltage and FIG. 5 shows three-pole (L1, L2, L3) line voltage supply of the evaluation and/or tripping electronics 6 and the open circuit shunt release 3.

What is claimed is:

1. Ground fault circuit interrupter with a residual current transformer (7) which is connected via evaluation and/or tripping electronics (6) to a open circuit shunt release (3), the open circuit shunt release (3) via a breaker mechanism (5) actuating the main contacts (10) in the leads (L1, L2, L3) to be monitored, the line voltage supply of the evaluation and/or tripping electronics (6) and/or the open circuit shunt release (3) being connected electrically separably to a least one lead (L1, L2, L3), characterized in that the evaluation and/or tripping electronics (6) and/or the open circuit shunt release (3) is connected via auxiliary contact apparatus (8) to at least two leads (L1, L2, L3, N), and that the movable auxiliary contacts (8.1) of the auxiliary contact apparatus (8) are located on the drum controller (21) of the main contact (10) and the housing-mounted auxiliary contacts (8.2) of the auxiliary contact apparatus (8) are located in the housing cover (12) of the ground fault circuit interrupter.

2. Ground fault circuit interrupter as claimed in claim 1, wherein voltage supply of the evaluation and/or tripping electronics (6) and/or the open circuit shunt release (3) can take place via a rectifier (2).

3. Ground fault circuit interrupter as claimed in claim 2, wherein the rectifier (2) is connected to the line by three poles (L1, L2, L3).

4. Ground fault circuit interrupter as claimed in claim 2, wherein the rectifier (2) is connected to the line by all poles (L1, L2, L3, N).

5. Ground fault circuit interrupter as claimed in claim 2, wherein an overvoltage protector (1) is series connected to the rectifier (2).

6. Ground fault circuit interrupter as claimed in claim 2, wherein the housing-mounted auxiliary contacts (8.2), the rectifier (2), an overvoltage protector (1), the power cables (16) which lead from the auxiliary contacts (8.2) to the rectifier (2), and the contacts (19) located on the DC voltage side following the rectifier (2) are located in the housing cover (12) of the ground fault circuit interrupter.

7. Ground fault circuit interrupter as claimed in claim 6, wherein the contacts (18) in the housing trough (11) are assigned to the contacts (19) in the housing cover (12) and are electrically connected to the evaluation and/or tripping electronics (6) and/or the open circuit shunt release (3).

* * * * *